UNITED STATES PATENT OFFICE.

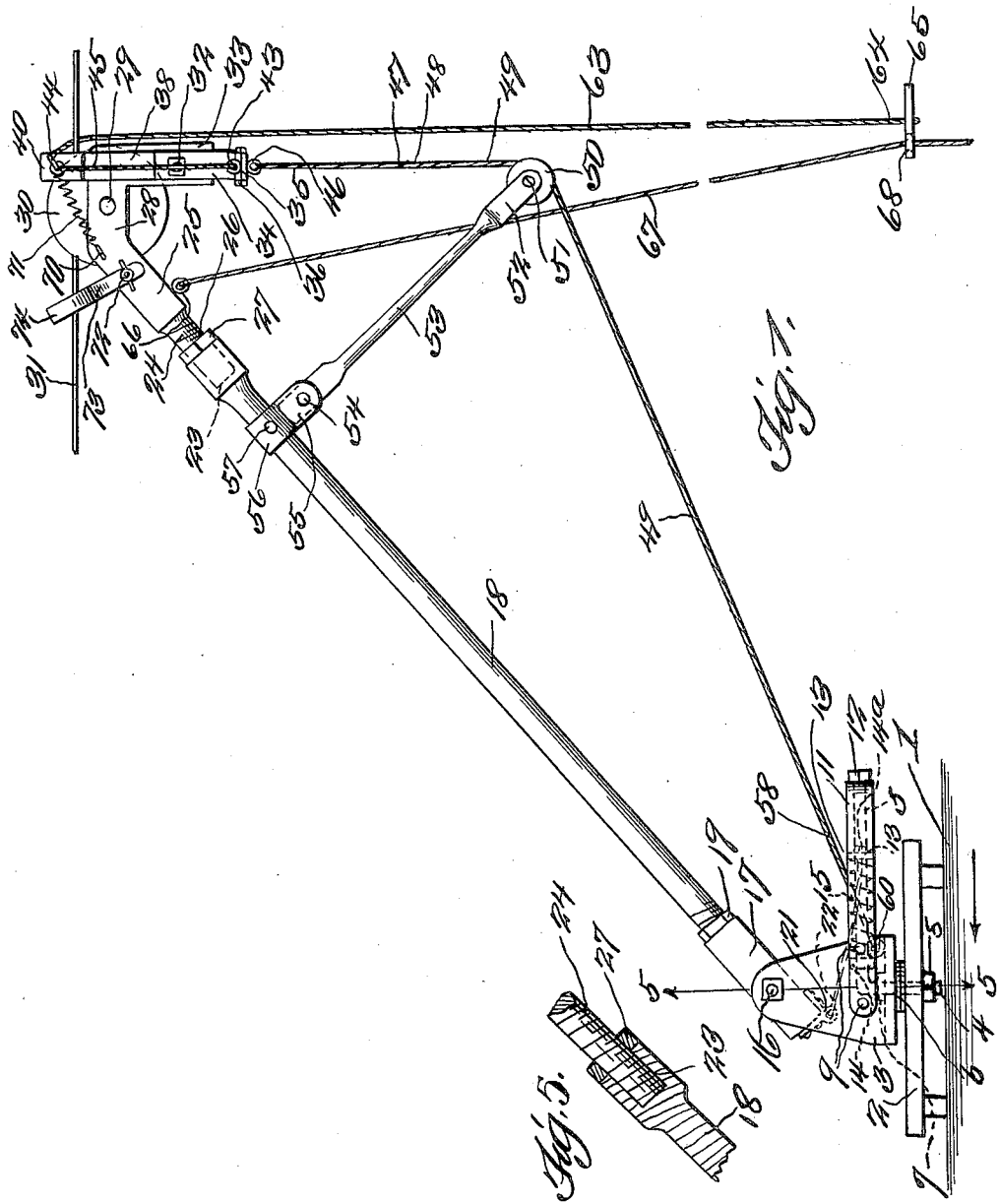

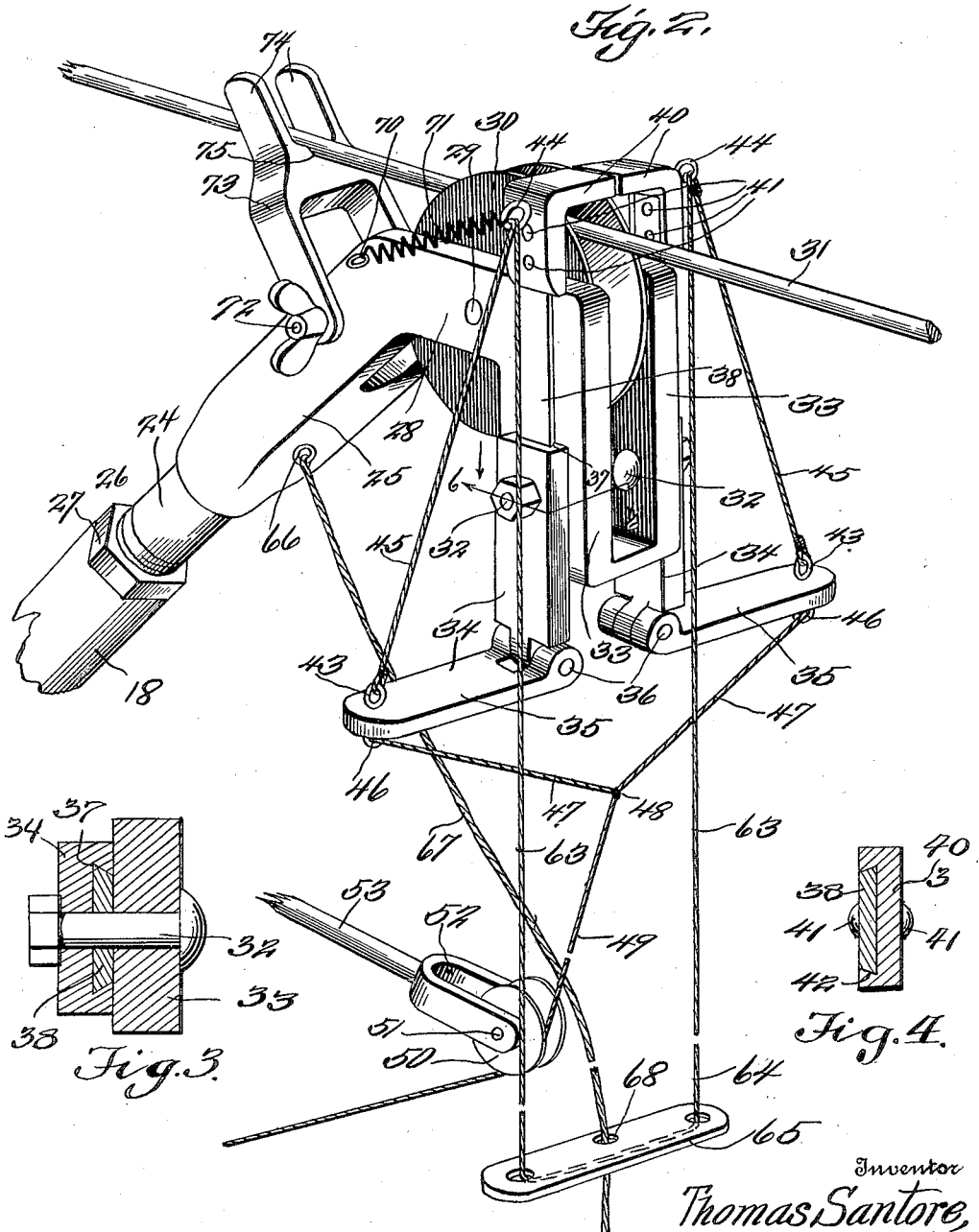

THOMAS SANTORE, OF MOUNT BRADDOCK, PENNSYLVANIA, ASSIGNOR OF ONE-SIXTH TO DOMINIC JENAWAY, OF MOUNT BRADDOCK, PENNSYLVANIA.

TROLLEY-POLE AND TROLLEY-GUARD.

1,101,666.  Specification of Letters Patent.  Patented June 30, 1914.

Application filed July 3, 1912. Serial No. 707,557.

*To all whom it may concern:*

Be it known that I, THOMAS SANTORE, a citizen of the United States, residing at Mount Braddock, in the county of Fayette and State of Pennsylvania, have invented a new and useful Trolley-Pole and Trolley-Guard; and I do hereby declare the following to be a full, clear, and exact description of the invention, such as will enable others skilled in the art to which it appertains to make and use the same.

This invention relates to a new and useful trolley pole and trolley guard.

As one of the objects of the invention, it is the aim to provide an improved device of this nature having novel, desirable and practical features of construction.

A further object of the invention is the provision of an improved tensioning means for the trolley pole, for holding the trolley wheel thereof frictionally against the wire.

A further object of the invention is to provide improved trolley guard members pivotally mounted one upon each side of the trolley head, for retaining the trolley wheel in engagement with the trolley wire.

A further object of the invention is the provision of means for automatically closing the trolley guard members, when the pole is swung downwardly on its pivot, and for holding the guard members closed, the automatically actuating means for the guard members also acting to throw the guard members open, when the trolley wheel is disengaged from the wire.

The invention comprises further features and combination of parts, as hereinafter set forth, shown in the drawings and claimed.

In the drawings:—Figure 1 is a view in elevation showing the improved trolley pole and trolley guard, as applied to the top of a car. Fig. 2 is a perspective view of the trolley head with the trolley wheel therein, showing the improved trolley guard members, and the means for operating them. Fig. 3 is a sectional view on line 6—6 of Fig. 2. Fig. 4 is a sectional view on line 7—7 of Fig. 3. Fig. 5 is a detail sectional view showing a connection between the trolley head and the trolley pole.

Referring more particularly to the drawings 1 designates substantially the top of the car having a platform 2 thereon upon which is mounted to oscillate horizontally a bracket between the arms of which is pivotally mounted a head 17 to which is secured the lower end of the trolley pole 18. The trolley pole 18 is threaded in the base, there being a lock nut 19 for rendering the trolley pole secure. Washers 20 are mounted between the sides of the bracket and the base, thereby lessening the frictional wear on the base 17. The upper end of the trolley pole terminates in a socket 23, in which an extension 24 of the trolley head 25 is threaded at 26, there being a lock nut 27 in order to render a secure joint. Mounted between the forks or sides 28, and upon the pin or shaft 29, is the usual form of trolley wheel 30, which is adapted to frictionally contact with the trolley wire 31. Pivotally mounted upon the bolts 32, which are carried by the downwardly extending sides 33 of the forks 28, and adjacent the sides 33 are plates 34, to the lower ends of which laterally extending extension plates 35 are hinged at 36. The plates 34 are provided with guide recesses 37, in which the spring blades 38 are dove-tailed, the same being secured in said recesses by the bolts 32. The upper ends of the spring blades are dove-tailed in the angled members 40, which form trolley wire guards or jaws, for retaining the wire in the groove of the trolley wheel. Bolts or other suitable means 41 hold the upper ends of the blades dove-tailed as shown at 42 in the angular members 40. Connecting the extension plates 35 and the angular member 40, by means of the eyes 43 and 44, are ropes or cables 45. Secured to under face of the extension plates 35 adjacent their outer ends are eyes 46, to which the cables or ropes 47 are connected. These ropes or cables 47 form a junction 48 with the cable 49, which passes over the pulley 50, mounted upon the pin 51 of the fork 52 of the arm 53. This arm 53 is secured at 54 between the ears 55 of the sleeves 56, which is secured at 57 to the trolley pole 18. The arm 53 beyond the connection 54 is rectangular, as shown, and engages the collar between the ears 55, so as to prevent the arm from dropping to a vertical position. The end portion 58 of the cable or rope 49 is secured to the eye 60 of the bracket member 3. When the trolley pole is down in the position shown in Fig. 1, and the trolley wheel is in engagement with the trolley wire, the rope or cable 49 is loose, and owing to the spring blades 38, the angled members 40 forming the trolley guard are held closed, thereby acting to retain the wire in the groove of the wheel. However, when the wheel is out of engagement with the trolley wire 31, and the trolley pole 18 is in a substantially vertical position, the jaws or guards are held open against the action of the spring blades 38, because the cable or rope 49 is drawn taut, owing to the fact that the distance between where the cables or ropes 47 connect to the eyes 46, and where the cable or rope 49 connects to the eyes 60 becomes greater.

The purpose for holding the guards open when the pole is in a substantially vertical position is to obtain their open relations with one another, so that when the plate 65 and the rope 67 are taken hold of at the same time to pull the pole downwardly so as to engage the trolley wheel with the trolley wire, said open relations with said guards will be maintained until the trolley wheel engages the wire. The tightness of the cable or rope 49, when the trolley pole assumes a substantially vertical position is assisted and increased by the provision of the arm 53. Connecting to the eyes 44 are the ends of the cable 63, which terminates in a loop 64, which carries a plate 65. Connected to an eye 66 of the trolley head is a rope or cable 67, which passes through an aperture 68 of the plate 65. When it is desired to disengage the trolley wheel from the trolley wire, a downward pulling action may be exerted upon the plate 65, which will throw the jaws or guards 40 outwardly, against the action of the spring blades, and then by pulling upon the cable or rope 67 at the same time, the trolley pole may be pulled downwardly, and then by throwing the trolley head slightly to one side of the trolley wire, the wheel 30 is disengaged from the trolley wire. The head 25 is provided with eyes 70, between which and the eyes 44 springs 71 are connected, which are placed slightly under tension when the trolley guards are opened.

Extending through the trolley head is a bolt 72, upon which a U-shaped member 73 is pivotally mounted, the upper forward portion of which terminates in forks 74. Formed between the forks 74 is a groove 75, which receives the trolley wire 31, and constitutes means for scraping or cutting the ice or sleet from the wire.

In the drawings there is disclosed a certain structure, but in practical fields this structure may necessitate alterations, to which the patentee is entitled, provided the alterations are comprehended within the scope of what is claimed.

From the foregoing it is to be noted there has been devised a novel and essentially new and improved trolley pole connection and trolley guard, and one which has been found particularly desirable and practical.

The invention having been set forth, what is claimed as new and useful is:—

1. In combination with a trolley head having a downwardly extending loop portion, plates pivotally bolted to the outer faces of the sides of the loop portion, a pair of angular arms designed to close over the trolley wire, resilient connections between the angular arms and said plates, laterally extending arms hingedly connected to the lower end of said plates, connections between the lateral arms and the angular arms, means connected to the lateral arm designed to exert downward pull on the lateral arms when the pole of the head moves toward a vertical position, to throw the angular arms apart against the resilient connection, means connected to the angular arms to pull thereon to hold them separated when lowering the pole, and a trolley wheel carried by said head.

2. In combination with a trolley pole head having a downwardly extending loop portion, a trolley wheel mounted in the head, a pair of plates pivotally bolted to the outer faces of the sides of the loop portion, a pair of laterally extending arms hinged to the lower ends of said plates, a pair of angular arms designed to close over the trolley wheel and wire constituting trolley guards to retain the wire in engagement with the wheel when the trolley pole is down, resilient leaf blades connecting said angular arms to the upper portions of said plates exerting a normal pressure to hold the angular arms closed over the trolley wire, connections between the angular arms and the outer ends of the lateral arms, means connected to the outer ends of the lateral arms designed to pull thereon whereby the angular arms are thrust apart when the trolley pole is thrown toward a vertical position, and means connected to the angular arms for holding them separated when lowering the trolley pole.

In testimony whereof I have signed my name to this specification in the presence of two subscribing witnesses.

THOMAS SANTORE.

Witnesses:
DOMINIC JENAWAY,
ROBERT A. BOSWELL.